(12) United States Patent
Weir et al.

(10) Patent No.: US 11,494,706 B2
(45) Date of Patent: Nov. 8, 2022

(54) SOCIALLY DISTANT SEATING ARRANGEMENT MANAGEMENT

(71) Applicant: Royal Caribbean Cruises Ltd., Miami, FL (US)

(72) Inventors: Nicholas Weir, Miami, FL (US); Steven M. Greenberg, Boynton Beach, FL (US)

(73) Assignee: Royal Caribbean Cruises LTD., Miami, FL (US)

( * ) Notice: Subject to any disclaimer, the term of this patent is extended or adjusted under 35 U.S.C. 154(b) by 5 days.

(21) Appl. No.: 15/931,522

(22) Filed: May 13, 2020

(65) Prior Publication Data

US 2021/0357820 A1 Nov. 18, 2021

(51) Int. Cl.
*G06Q 10/00* (2012.01)
*G06Q 10/02* (2012.01)
*G06F 3/0482* (2013.01)
*G08B 5/22* (2006.01)

(52) U.S. Cl.
CPC ........... *G06Q 10/02* (2013.01); *G06F 3/0482* (2013.01); *G08B 5/221* (2013.01)

(58) Field of Classification Search
None
See application file for complete search history.

(56) References Cited

U.S. PATENT DOCUMENTS

| | | | | |
|---|---|---|---|---|
| 2012/0010911 A1* | 1/2012 | Lele | ........................ | G06Q 10/02 705/5 |
| 2012/0010913 A1* | 1/2012 | Lele | ........................ | G06Q 10/02 705/5 |
| 2015/0242947 A1* | 8/2015 | Wilson | .................... | G06Q 10/02 705/5 |

(Continued)

FOREIGN PATENT DOCUMENTS

| | | | |
|---|---|---|---|
| WO | WO-2013192507 A2 * | 12/2013 | ............. G06Q 10/02 |
| WO | WO-2018099990 A1 * | 6/2018 | |

OTHER PUBLICATIONS

Kaplan Farelogix Prepares Seat Map Selection For Social Distancing Age (Year: 2020).*

(Continued)

*Primary Examiner* — Tonya Joseph
(74) *Attorney, Agent, or Firm* — CRGO Global; Steven M. Greenberg (57) ABSTRACT

Socially distant seating arrangement management includes loading a seating chart for a seating area of an event venue into memory of a computer, setting both a social distancing parameter and also a seat width parameter for seats in the seating area and computing a number of successive seats with a combined width according to the seat width parameter minimally exceeding the social distancing parameter. The method further includes enabling for selection in a user interface to the seating chart, available ones of the seats in a selected row of the seating area that are separated from one another by the computed number of the seats and disabling (Continued)

from selection in the user interface, the seats separating the available ones of the seats. Finally, the method includes recording in the memory of the computer, different selections in the seating chart by different end users of the available ones of the seats.

15 Claims, 2 Drawing Sheets

(56) References Cited

U.S. PATENT DOCUMENTS

| | | | |
|---|---|---|---|
| 2016/0189061 A1* | 6/2016 | Jain | G06Q 10/02 |
| | | | 705/5 |
| 2017/0228663 A1* | 8/2017 | Lyon | G06Q 10/087 |
| 2019/0102752 A1* | 4/2019 | Valenti | G07C 5/0808 |
| 2019/0114562 A1* | 4/2019 | Parry | G06Q 30/0611 |

OTHER PUBLICATIONS

Barrington Mainstage Socially Distanced (SD) Seating https://web.archive.org/web/20200501201246/https://barringtonstageco.org/distancing/ (Year: 2020).*

* cited by examiner

SOCIALLY DISTANT SEATING ARRANGEMENT MANAGEMENT

BACKGROUND OF THE INVENTION

Field of the Invention

The present invention relates to the field of event seating and more particularly to automated seating chart generation.

Description of the Related Art

The public performance of sport and art always includes a performance area and a viewing area, the public performance in most instances occurring in the performance area and the viewing public positioned to view the performance area from an adjacent viewing area. The viewing area can be positioned on one or more sides of the performance area ranging from a traditional theater arrangement to a full encompassing of all sides of the performance area—the veritable in the round arrangement. In the sporting context, just the same, stadium seating varies from a single or opposing side configuration of bleacher seating to the full encompassment of the field, court or ring.

Generally, there are two types of event seating—general admission and reserved seating. For any given public performance, the seats in the viewing area may be pre-assigned to those participating in reserved seating, or the seats may be allocated first come first served as in the case of general admission, or some blended arrangement where a portion of the seating is pre-assigned whilst another portion remains open until the time of the event and in fact, during the event. Indeed, in some instances seating may include an area that has no actual seats, but just an area generally designated to accommodate a certain number of patrons for standing room only.

In the modern era of the global Internet, seating reservation computing systems allocate seating online to remotely disposed customers purchasing tickets to an event. The typical user experience includes a clickable visualization of a seating chart permitting the end user to select the best available seating remaining at the time of the purchase. The seating chart dynamically changes as seats are reserved by other customers. More sophisticated systems include pricing information by the seat within the seating chart and even more sophisticated systems automatically recommend a best grouping of seats according to price, contemporaneous availability and a number of seats requested.

In many scenarios, the physical nature of seating cannot change. That is to say, each seat has a fixed width and each aisle of seating, a fixed number of seats at a fixed depth. Even for a venue where the chairs themselves are portable, the structure of each individual chair remains immutable and the viewing area in which the chairs are placed, fixed so that each aisle of seating still holds only a fixed number of seats at a fixed depth according to the number of chairs allocated to the viewing area. In consequence, the viewing area typically has a maximum capacity of individuals and it is the aim of the seating reservation computing system to optimize the seating of guests, irrespective of the size of each grouping of guests so as to fill every seat in the viewing area with a guest.

Despite the best efforts of seating reservation systems, both automated and manual, not every seat may be allocated for every event, mostly accounting for the variable size of different groupings of event goers seeking seating as a group. The problem of group seating individuals in a viewing area according to a fixed seating chart only has become compounded by recent concerns with the communicable transmission of disease. Indeed, in the modern era of quarantine and social distancing simply seating individuals next to one another in a viewing area is no longer practical in all circumstances, yet for the event goer, the desire to attend live events and sit with groups of companions remains a paramount factor in attending a live event. Traditional automated seating reservation systems are simply not equipped to account for social distancing in managing seat reservations beyond the unimaginative and suboptimal removal from possible reservation, every other seat or every other row in a seating chart resulting in a sub-optimal seating arrangement and leaving the event goer with little confidence in the safety of attending the live event.

BRIEF SUMMARY OF THE INVENTION

Embodiments of the present invention address deficiencies of the art in respect to automated seat reservations accounting for social distancing and provide a novel and non-obvious method, system and computer program product for socially distant seating arrangement management. In an embodiment of the invention, a method for socially distant seating arrangement management includes loading a seating chart for a seating area of an event venue into memory of a computer, setting both a social distancing parameter and also a seat width parameter for seats in the seating area and computing in the memory of the computer, a number of successive seats with a combined width according to the seat width parameter minimally exceeding the social distancing parameter. The method further includes enabling for selection in a user interface to the seating chart, available ones of the seats in a selected row of the seating area that are separated from one another by the computed number of the seats and disabling from selection in the user interface, the seats separating the available ones of the seats. Finally, the method includes recording in the memory of the computer, different selections in the seating chart by different end users of the available ones of the seats.

In one aspect of the embodiment, the method additionally includes initially enabling for selection in the user interface, end ones of the seats in the seating area that border only one other of the seats and enabling others of the seats in the seating area as the available ones of the seats separated from one another and from the end ones of the seats by the computed number of seats.

In another aspect of the embodiment, the method additionally includes receiving through the user interface a request to seat a grouping of individuals exempt from social distancing requirements, locating within the seating chart a sequence of consecutive ones of the seats equal to or greater than a number of seats required for the grouping between two of the available ones of the seats, recording in the memory of the computer, a group selection of the number of seats required for the grouping from amongst the sequence of consecutive ones of the seats beginning with one of the two of the available ones of the seats and re-enabling for selection in the user interface to the seating chart, available ones of the seats in the row separated from the group selection and from one another by the computed number of the seats and disabling from selection in the user interface, the seats separating the available ones of the seats and the group selection.

In yet another aspect of the embodiment, the method additionally includes identifying in a different row of seats in the seating chart, ones of the seats in the different row that are separated from the available ones of the seats in the selected row of seats in the seating chart by at least the social distancing parameter. For example, the different row may or may not be adjacent to the selected row. The method then includes enabling for selection in the user interface to the seating chart, the identified ones of the seats in the different row of seats in the seating chart. In this regard, on the condition that none of the seats in the different row are determined to be separated from the available ones of the seats in the selected row of seats in the seating chart by at least the social distancing parameter, the method can include disabling selection of all of the seats in the different row, identifying in an adjacent row of seats to the different row of seats in the seating chart, ones of the seats in the adjacent row that are separated from the available ones of the seats in the selected row of seats in the seating chart by at least the social distancing parameter, and enabling for selection in the user interface to the seating chart, the identified ones of the seats in the adjacent row of seats in the seating chart.

In another embodiment of the invention, a data processing system is adapted for socially distant seating arrangement management. The system includes a host computing platform that has one or more computers, each with memory and at least one processor. The system further includes a socially distant seating arrangement management module. The module includes computer program instructions that have been enabled while executing in the host computing platform to load a seating chart for a seating area of an event venue into memory of a computer, set both a social distancing parameter and a seat width parameter for seats in the seating area and compute in the memory of the computer, a number of successive seats with a combined width according to the seat width parameter minimally exceeding the social distancing parameter. The program instructions further have been enabled to enable for selection in a user interface to the seating chart, available ones of the seats in a selected row of the seating area that are separated from one another by the computed number of the seats and disabling from selection in the user interface, the seats separating the available ones of the seats and to record in the memory of the computer, different selections in the seating chart by different end users of the available ones of the seats.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for socially distant seating arrangement management. In accordance with an embodiment of the invention, a social distancing parameter can be applied to a fixed width of each seat in an arrangement of seats of an electronic seating chart so as to enable selected ones of the seats for selection in a seating reservation system whilst others of the seats are disabled from selection. To the extent that a seat in a row neighbors only one seat, that seat may be enabled for selection with a discrete number of adjacent seats then being disabled from selection in accordance with the social distancing parameter. Of note, the seats in the row are not only selectively enabled and disabled in accordance with the social distancing parameter for other seats in the row, but also in consideration of the enabled seats in adjacent rows so that the social distancing parameter is enforced fully along three-hundred and sixty degrees from each seat in each row.

Notably, recognizing the necessity to accommodate group requests for seating, in one aspect of the invention, in response to the receipt of a group seating request, to the extent that the grouping of individuals for the request are determined to be exempt from social distancing requirements (such as members of the same family), a number of individuals in the group is determined and two different previously enabled seats in a row identified between which a number of seats for the number of individuals can be accommodated. Then, each seat from one of the previously enabled seats extending towards the other one of the previously enabled seats are enabled for selection by each individual of the group. Then, each successive seat thereafter is disabled from selection until the social distancing parameter is satisfied. Finally, a new pattern of enabled and disabled seats is applied to the remaining seats in the row accounting for the social distancing parameter. As well, the pattern of enabled and disabled seats is also applied in each adjacent row to account for the grouping of seats.

To the extent that a seat already is selected for reservation in the row that is to be disabled in consequence of the grouping of seats, an enabled seat disposed between the grouping and the selected seat may be disabled to account for compliance with the social distancing parameter. Likewise, to the extent that a seat already is selected for reservation in an adjacent row that is to be disabled in consequence of the grouping of seats, an enabled seat disposed between the grouping and the selected seat may be disabled to account for compliance with the social distancing parameter. Finally, to the extent that a seat already is selected for reservation in an adjacent row that is to be disabled in consequence of the grouping of seats, the selected seat may be shifted away from the grouping so as to comply with the social distancing parameter and a new pattern of enabled and disabled seats established leading from the shifted seat.

Figure 1:
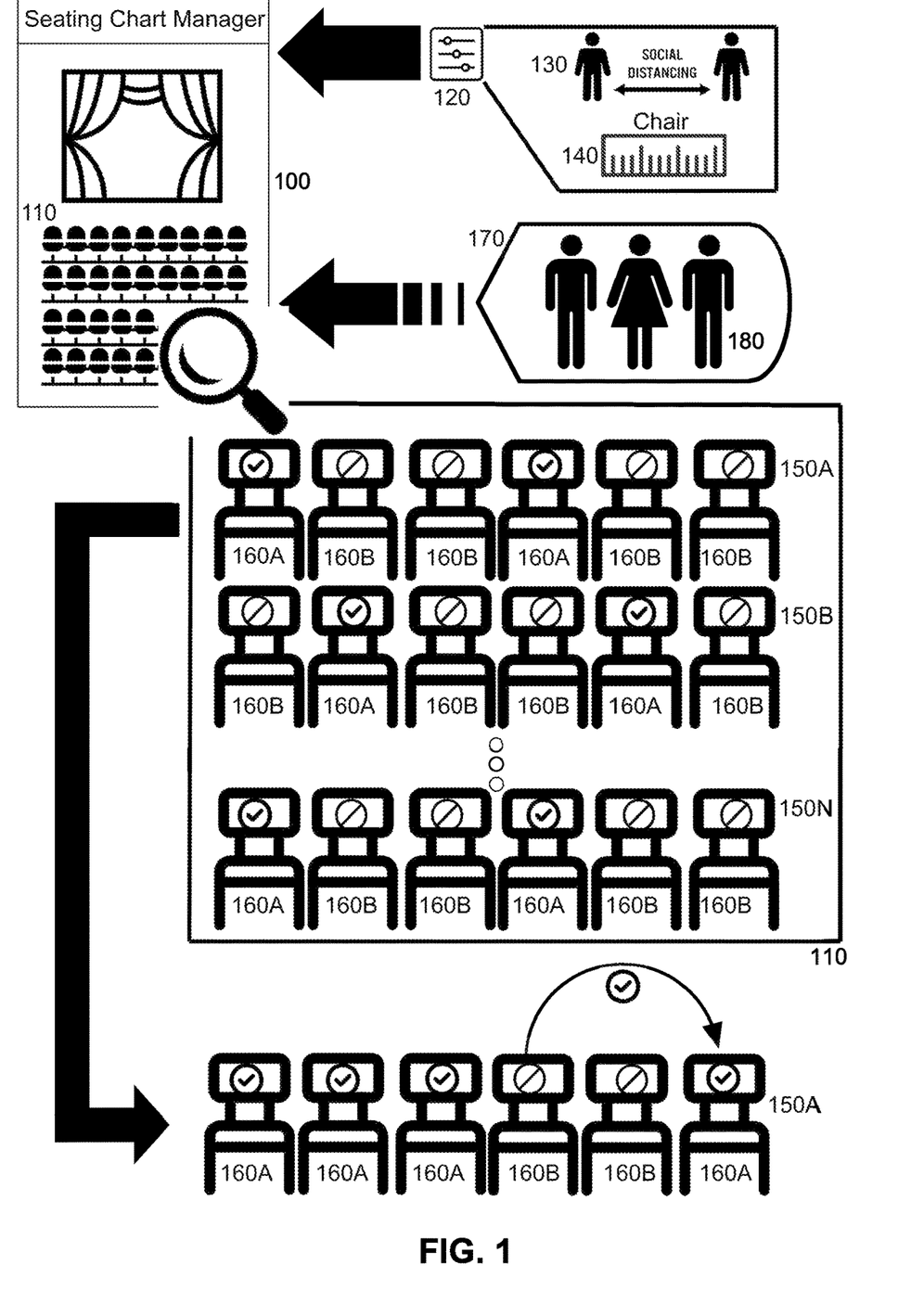
FIG. 1 is pictorial illustration of a process for socially distant seating arrangement management.

In more particular illustration, FIG. 1 pictorially shows a process for socially distant seating arrangement management. As shown in FIG. 1, a seating chart manager 100 provides a selectable seating chart user interface 110 of different seats 160A, 160B in different rows 150A, 150B, 150N of a seating area. Each of the seats 160A, 160B may be programmatically enabled or disabled for selection depending upon two factors 120: a social distancing parameter 130 specifying a required distance between two individuals seated near one another, and a physical measurement 140 of the space in which an individual may sit in one the seats 160A, 156B of the seating area, for instance a known width of each of the seats 160A, 160B, or other such relevant dimension.

The seating chart manager 100 programmatically enables different ones of the seats 160A, 160B, in each of the rows 150A, 150B, 150N for selection, or the seating chart manager 100 programmatically disables other ones of the seats 160A, 160B disabled for selection. Seats 160A that are enabled for selection may be allocated to a reserving end user upon one of the seats 160A being selected in the seating chart in the selectable seating chart user interface 110. Conversely, seats 160B that are disabled for selection cannot be allocated to any individual.

All of the seats 160A, 160B may be processed at the outset by the seating chart manager 100 by enabling for selection every one of the seats 160A, 160B having only one adjacent neighboring one of the seats 160A, 160B, in every row 150A, 150B, 150N or alternating one of the rows 150A, 150B, 150N depending upon a depth of each row 150A, 150B, 150N and the social distancing parameter 130 so as to ensure a minimum distance between each the enabled seats 160A. The seating chart manager 100 than processes each row 150A, 150B, 150N, disabling every one of the seats 160B adjacent to an enabled seat 160A until the social distancing parameter 130 has been minimally met. Then, the seating chart manager 100 enables the next seat 160A.

The process continues for each adjacent row 150A, 150B, 150N accounting not only for the seats 160A, 160B within the same row, but also the seats 160A, 160B in the adjacent rows by computing the distance between seats 160A, 160B in different rows 150A, 150B, 150N according to the width of each seat 160A, 160B and the depth of each row 150A, 150B, 150N, the distance between two seats 160A, 160B. In this instance, the distance between two enabled seats 160A can be computed as the square root of the sum of the square of the depth of the row and the square of the lateral distance between the enabled seats 160. To the extent that the seats 160A, 160B are laterally offset in alignment between adjacent rows 150A, 150B, 150N as is often the case, the lateral number of seats 160A, 160B between two enabled seats 160A in different rows 150A, 150B, 150N can include a fractional value of the width of one of the seats 160A, 160, or the number of seats can be "rounded up" to a whole value.

Notably, the seating chart manager 100 is adapted to process group seating requests 170 for groupings of individuals 180 entitled to sit next to one another despite a social distancing requirement, such as members of the same family unit. In this regard, upon receiving such a request 170, the seating chart manager 100 determines a number of individuals 180 in the grouping and locates a best available enabled seat 160A in a best available one of the rows 150A, 150B, 150N in the seating chart user interface 110. The seating chart manager 100 then allocates in one lateral direction of the best available one of the rows 150A, 150B, 150N a sequence of the seats 160A, 160 for reservation to the grouping of the individuals 180. Then, the seating chart manager 100 disables an adjacent set of the seats 160A, 160B in the best available one of the rows 150A, 150B, 150N until the social distancing parameter 130 has been met for the best available one of the rows 150A, 150B, 150N accounting for the physical measurement 140. Thereafter, the seating chart manager 100 enables the next adjacent seat 160A, 160B. The process then continues for each other seat 160A, 160B in the best available one of the rows 150A, 150B, 150N.

As for the adjacent ones of the rows 150A, 150B, 150N a distance is computed between each enabled seat 160A in the adjacent ones of the rows 150A, 150B, 150N and each enabled seat 160A in the best available ones of the rows 150A, 150B, 150N. To the extent that for an enabled seat 160A in the adjacent one of the rows 150A, 150B, 150N, the distance as computed falls short of the social distancing parameter 130, the enabled seat 160A is then converted to a disabled seat 160B. The process then continues for each other one of the rows 150A, 150B, 150N so as to ensure proper social distancing between each enabled seat 160 excepting for those of the enabled seats 160A allocated to the grouping of individuals 180 exempted from social distancing rules.

As it will be recognized, it may be the case that an enabled seat 160A in the best available one of the rows 150A, 150B, 150N or in the adjacent one of the rows 150A, 150B, 150N may be allocated already to an individual prior to receiving the request 170 so as to inhibit the conversion of the enabled seat 160A to a disabled seat 160B in order to accommodate the grouping of individuals 180 in the best available one of the rows 150A, 150B, 150N. To that end, the seating chart manager 100 can pre-process the prospective allocation of seats 160A, 160B in the best available one of the rows 150A, 150B, 150N in order to determine if such a circumstance would arise. If so, a next best available one of the rows 150A, 150B, 150N may be pre-processed to determine if an already allocated enabled seat 160A is required to be converted to a disabled seat. Once one of the rows 150A, 150B, 150N is determined to be able to accommodate seats 160A, 160B for the grouping of individuals 180 during pre-processing, the seats 160A, 160B may be allocated as before with the previously enabled seats 160A converted to disabled seats 160B as required.

Figure 2:
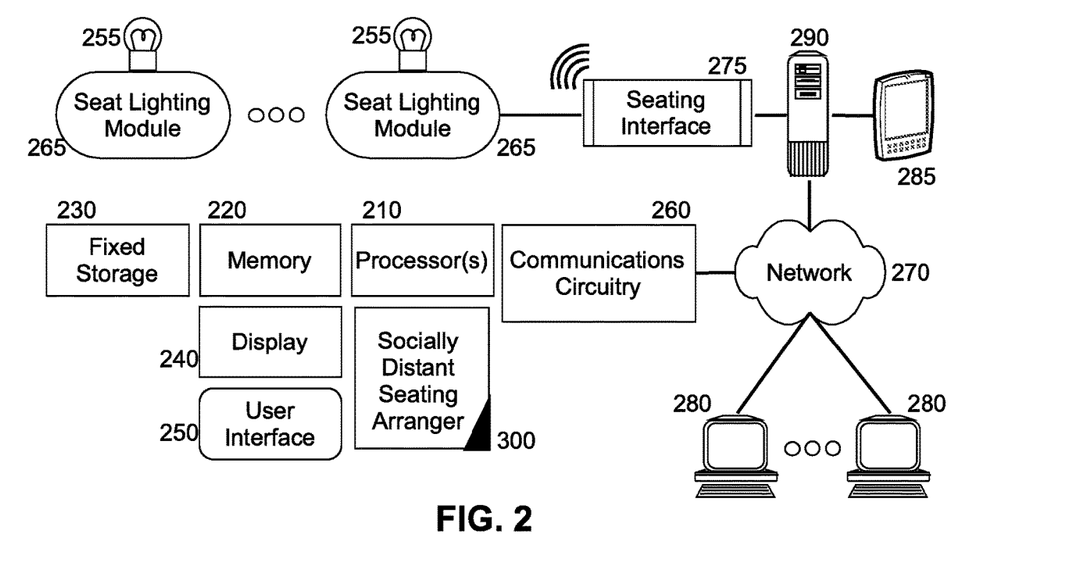
FIG. 2 is a schematic diagram depicting an automated seat reservation data processing system adapted for socially distant seating arrangement management; and, FIG. 3 is a flow chart illustrating a process for socially distant seating arrangement management.

The process described in connection with FIG. 1 may be implemented in an automated seat reservation data processing system. In yet further illustration, FIG. 2, schematically shows an automated seat reservation data processing system adapted for socially distant seating arrangement management. The system includes one or more processors 210, memory 220, fixed storage 230, a display 240 and communications circuitry 260 adapted to receive and transmit communications to and from client computing devices 280 over computer communications network 270 and also to server computer 290 over the computer communications network 270.

The system also includes a socially distant seating arrangement module 300 that includes computer program instructions enabled during execution by the one or more processors 210 to selectively enable and disable individual seats in different rows of a seating chart for selection by end users at the client computing devices 280 through a user interface 250. The program instructions particularly enable and disable seats according to a combination of a social distancing parameter such as a minimum distance separating individuals in the seating area defined in the seating chart, and also a physical dimension of the seats such as a width and optionally, a depth of each of the rows.

In this regard, the program instructions model the seating chart as a data structure formed of different instances of a seat object in different instances of a row object. Each instance of the seat object includes a data member indicating whether or not the instance of the seat object is enabled for selection or disabled from selection. As well, each instance of a seat object may indicate whether or not the seat object is allocated to a particular individual. Each instance of a seat object also may indicate a specific dimension. In particular, the specific dimension may be an actual measurement such as a width, or the specific dimension may refer to a constant variable such as "Regular" or "Premium", each constant variable being defined as an actual measurement.

Optionally, each instance of a seat object may indicate a specific instance of a row to which the instance of the seat belongs. Each instance of a row object, in turn, may include a reference to a number of instances of the seat object belonging to the instance of the row, and each instance of a row object may also refer to one or more adjacent rows. Finally, each instance of a row object may indicate one or more row dimensions including a depth of a row and also an offset value indicating a measure of misalignment with an adjacent row. As an alternative, the data structure may be implemented in a relational database, with each row in a row table indicating the characteristics of the row, each characteristic being defined in a separate column, and each seat in a seat table indicating the characteristics of the seat including a member row, each characteristic being defined in a separate column.

In operation, once a seating area has been modeled in accordance with the data structure, each instance of a row object may be processed to enable selected instances of seat objects in the instance of the row object while disabling intermediate ones of the seat objects in the instance of the row object in order to accommodate a social distancing parameter. To the extent that each instance of the seat object has an identical dimension value, it is a matter of determining how many seats must be disabled of identical width in order to exceed the social distancing parameter. But, to the extent that some instances of the seat object have differing dimensions, the program instructions of the module 300 must individually access and sum the dimension value of each adjacent instance of a seat object until the sum exceeds the social distancing parameter and the program instructions then set the value in each corresponding instance of the seat object to disable. The program instructions further can process each successive instance of a row object to ensure proper social distancing between enabled ones of the seat objects in accordance with the social distancing parameter.

Notably, once the data structure has been processed not only to indicate which of the instances of the seat objects are enabled for selection, but also which seats that had been enabled are allocated to specific individuals, the data structure may be accessed in the server computer 290 so as to provide a seating chart to mobile computing device 285 of an usher. As well, through seating interface 275, a seat lighting module 265 with lighting element 255 may be affixed to each corresponding seat and illuminated in accordance with the data structure in order to indicate whether or not the seat is available and allocated for seating. For instance, a red colored one of the lamps 255 affixed to a seat may indicate that no seating is permitted in that seat, whereas a green colored one of the lamps 255 affixed to a seat may indicate that seating is permitted in that seat.

Figure 3:
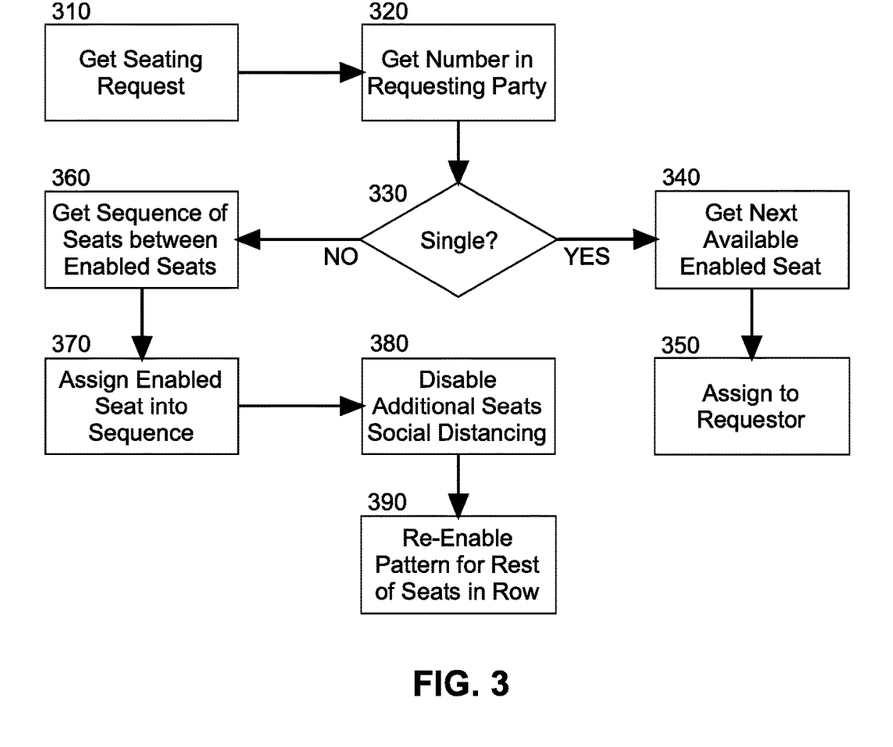

In even yet further illustration of the operation of the socially distant seating module 300, FIG. 3 is a flow chart illustrating a process for socially distant seating arrangement management. Beginning in block 310, a seating request is received and in block 320, a number of the individuals implicated by the request determined. In decision block 330, if the number of individuals is but a single individual, in block 340 the data structure of the seating area is queried to locate a best available seat, each a seat in a nearest row closest to a center position. Then, in block 350, the located seat is assigned to the requesting individual and the corresponding element of the data structure updated to reflect as much.

In decision block 330, if the number of individuals is multiple in nature, in block 360 the data structure is queried to locate in a best available row, a sequence of seats equivalent to the number of the individuals and in block 370, the data structure is updated to indicate that each of the seats are enabled for selection and then allocated to the number of the individuals. Then, in block 380 the data structure is modified to disable adjacent seats to the sequence in a number sufficient to account for the social distancing parameter. Finally, in block 390, the remaining seats in the best available row are reset as enabled or disabled as the case may be to ensure proper social distancing, and the process then continues for each adjacent row. In this way, the socially distant seating module 300 may account for social distancing in managing seat reservations beyond the unimaginative and suboptimal removal from possible reservation, every other seat or every other row in a seating chart resulting in a sub-optimal seating arrangement. Consequently, the event goer may have substantial confidence in the safety of attending a correspondent live event.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "include", "includes", and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

The invention claimed is:

1. A method for socially distant seating arrangement management, comprising:

defining a seating chart data structure into memory of a computer by creating different instances of a seat object and different instances of a row object, and associating sets of the different instances of the seat object with specific ones of the row object, the seat object including at least both a data member indicating whether or not a corresponding seat is occupied and also dimension value, the row object including at least a data member referencing an adjacent row, a totality of the instances of the seat object and the row object forming the seating chart data structure;

setting both a social distancing parameter and a seat width parameter for seats in the seating area, social distancing parameter specifying a required distance between individual people sitting in the sets in the seating area, the seat width parameter specifying a width of each of the seats in the seating area according to the dimension value of the seat object;

computing in the memory of the computer, a minimum number of successive seats which have a combined width computed as a product of the number of successive seats by the seat width parameter, so as to minimally exceed the social distancing parameter of the required distance;

enabling for selection in a user interface to the seating chart data structure, available ones of the seats in a selected row of the seating area that are separated from one another by the computed number of the seats and disabling from selection in the user interface, the seats separating the available ones of the seats and activating through a lighting module different lighting elements of the seats corresponding to ones of the instances of the seat object in the data structure having respective values for the data member indicating the corresponding seat is not occupied;

recording in the memory of the computer, different selections in the seating chart data structure by different end users of the available ones of the seats;

subsequent to the different selections, receiving through the user interface a request to seat a grouping of individuals exempt from social distancing requirements;

locating within the seating chart data structure a sequence of consecutive ones of the seats that are not selected, including ones of the seats disabled from selection, the consecutive ones of the seats being equal to or greater than a number of seats required for the grouping of individuals between two of the available ones of the seats;

recording in the memory of the computer, a group selection of the number of seats required for the grouping from amongst the sequence of consecutive ones of the seats; and, re-enabling for selection in the user interface to the seating chart data structure, available ones of the seats in the row, the available ones of the seats being separated from the group selection and from one another by the computed number of the seats, and disabling from selection in the user interface, ones of the seats separating the available ones of the seats and the group selection and activating through the lighting module different lighting elements of the seats re-enabled for selection.

2. The method of claim 1, further comprising:
initially enabling for selection in the user interface, end ones of the seats in the seating area that border only one other of the seats; and,
enabling others of the seats in the seating area as the available ones of the seats separated from one another and from the end ones of the seats by the computed number of seats.

3. The method of claim 1, further comprising:
identifying in a different row of seats in the seating chart data structure, ones of the seats in the different row that are separated from the available ones of the seats in the selected row of seats in the seating chart data structure by at least the social distancing parameter; and,
enabling for selection in the user interface to the seating chart data structure, the identified ones of the seats in the different row of seats in the seating chart data structure.

4. The method of claim 3, further comprising:
on condition that none of the seats in the different row are determined to be separated from the available ones of the seats in the selected row of seats in the seating chart data structure by at least the social distancing parameter, disabling selection of all of the seats in the different row.

5. The method of claim 3, wherein the different row is adjacent to the selected row.

6. A data processing system adapted for socially distant seating arrangement management, the system comprising:
a host computing platform comprising one or more computers, each comprising memory and at least one processor; and,
a socially distant seating arrangement management module comprising computer program instructions enabled while executing in the host computing platform to perform:
defining a seating chart data structure into memory of a computer by creating different instances of a seat object and different instances of a row object, and associating sets of the different instances of the seat object with specific ones of the row object, the seat object including at least both a data member indicating whether or not a corresponding seat is occupied and also dimension value, the row object including at least a data member referencing an adjacent row, a totality of the instances of the seat object and the row object forming the seating chart data structure;
setting both a social distancing parameter and a seat width parameter for seats in the seating area, social distancing parameter specifying a required distance between individual people sitting in the sets in the seating area, the seat width parameter specifying a width of each of the seats in the seating area according to the dimension value of the seat object;
computing in the memory of the computer, a minimum number of successive seats which have a combined width computed as a product of the number of successive seats by the seat width parameter, so as to minimally exceed the social distancing parameter of the required distance;
enabling for selection in a user interface to the seating chart data structure, available ones of the seats in a selected row of the seating area that are separated from one another by the computed number of the seats and disabling from selection in the user interface, the seats separating the available ones of the seats and activating through a lighting module different lighting elements of the seats corresponding to ones of the instances of the seat object in the data structure having respective values for the data member indicating the corresponding seat is not occupied;
recording in the memory of the computer, different selections in the seating chart data structure by different end users of the available ones of the seats;
subsequent to the different selections, receiving through the user interface a request to seat a grouping of individuals exempt from social distancing requirements;
locating within the seating chart data structure a sequence of consecutive ones of the seats that are not selected, including ones of the seats disabled from selection, the consecutive ones of the seats being equal to or greater than a number of seats required for the grouping of individuals between two of the available ones of the seats;
recording in the memory of the computer, a group selection of the number of seats required for the grouping from amongst the sequence of consecutive ones of the seats; and,
re-enabling for selection in the user interface to the seating chart data structure, available ones of the seats in the row, the available ones of the seats being separated from the group selection and from one another by the computed number of the seats, and disabling from selection in the user interface, ones of the seats separating the available ones of the seats and the group selection and activating through the lighting module different lighting elements of the seats re-enabled for selection.

7. The data processing system of claim 6, wherein the program instructions further perform:
initially enabling for selection in the user interface, end ones of the seats in the seating area that border only one other of the seats; and,
enabling others of the seats in the seating area as the available ones of the seats separated from one another and from the end ones of the seats by the computed number of seats.

8. The data processing system of claim 6, wherein the program instructions further perform:
identifying in a different row of seats in the seating chart data structure, ones of the seats in the different row that are separated from the available ones of the seats in the selected row of seats in the seating chart data structure by at least the social distancing parameter; and,
enabling for selection in the user interface to the seating chart data structure, the identified ones of the seats in the different row of seats in the seating chart data structure.

9. The data processing system of claim 8, wherein the program instructions further perform:
on condition that none of the seats in the different row are determined to be separated from the available ones of the seats in the selected row of seats in the seating chart data structure by at least the social distancing parameter, disabling selection of all of the seats in the different row.

10. The data processing system of claim 8, wherein the different row is adjacent to the selected row.

11. A computer program product for socially distant seating arrangement management, the computer program product including a non-transitory_computer readable storage medium having program instructions embodied there-with, the program instructions executable by a device to cause the device to perform a method including:

defining a seating chart data structure into memory of a computer by creating different instances of a seat object and different instances of a row object, and associating sets of the different instances of the seat object with specific ones of the row object, the seat object including at least both a data member indicating whether or not a corresponding seat is occupied and also dimension value, the row object including at least a data member referencing an adjacent row, a totality of the instances of the seat object and the row object forming the seating chart data structure;

setting both a social distancing parameter and a seat width parameter for seats in the seating area, social distancing parameter specifying a required distance between individual people sitting in the sets in the seating area, the seat width parameter specifying a width of each of the seats in the seating area according to the dimension value of the seat object;

computing in the memory of the computer, a minimum number of successive seats which have a combined width computed as a product of the number of successive seats by the seat width parameter, so as to minimally exceed the social distancing parameter of the required distance;

enabling for selection in a user interface to the seating chart data structure, available ones of the seats in a selected row of the seating area that are separated from one another by the computed number of the seats and disabling from selection in the user interface, the seats separating the available ones of the seats and activating through a lighting module different lighting elements of the seats corresponding to ones of the instances of the seat object in the data structure having respective values for the data member indicating the corresponding seat is not occupied;

recording in the memory of the computer, different selections in the seating chart data structure by different end users of the available ones of the seats;

subsequent to the different selections, receiving through the user interface a request to seat a grouping of individuals exempt from social distancing requirements;

locating within the seating chart data structure a sequence of consecutive ones of the seats that are not selected, including ones of the seats disabled from selection, the consecutive ones of the seats being equal to or greater than a number of seats required for the grouping of individuals between two of the available ones of the seats;

recording in the memory of the computer, a group selection of the number of seats required for the grouping from amongst the sequence of consecutive ones of the seats; and, re-enabling for selection in the user interface to the seating chart, available ones of the seats in the row, the available ones of the seats being separated from the group selection and from one another by the computed number of the seats, and disabling from selection in the user interface, ones of the seats separating the available ones of the seats and the group selection and activating through the lighting module different lighting elements of the seats re-enabled for selection.

12. The computer program product of claim 11, wherein the method further includes:

initially enabling for selection in the user interface, end ones of the seats in the seating area that border only one other of the seats; and, enabling others of the seats in the seating area as the available ones of the seats separated from one another and from the end ones of the seats by the computed number of seats.

13. The computer program product of claim 11, wherein the method further includes:

identifying in a different row of seats in the seating chart data structure, ones of the seats in the different row that are separated from the available ones of the seats in the selected row of seats in the seating chart data structure by at least the social distancing parameter; and, enabling for selection in the user interface to the seating chart data structure, the identified ones of the seats in the different row of seats in the seating chart data structure.

14. The computer program product of claim 13, wherein the method further includes: on condition that none of the seats in the different row are determined to be separated from the available ones of the seats in the selected row of seats in the seating chart data structure by at least the social distancing parameter, disabling selection of all of the seats in the different row.

15. The computer program product of claim 13, wherein the different row is adjacent to the selected row.

* * * * *